Figure 1:
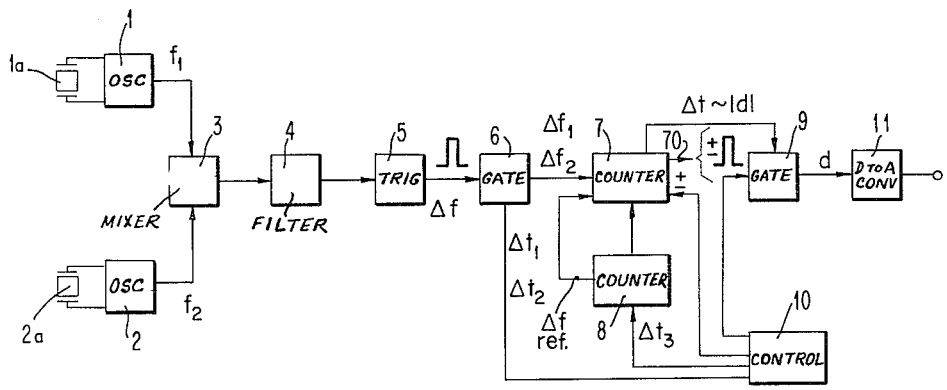

United States Patent Office 3,227,952
Patented Jan. 4, 1966

3,227,952
DEVICE FOR CONTROLLING A PROCESS REPRESENTABLE BY ELECTRICAL OSCILLATIONS AND INCLUDING DIGITAL CONVERSION MEANS
Walter E. Proebster, Oberrieden, Zurich, Kurt Kohler, Geneva, and Wolfgang Dietrich, Adliswil, Zurich, Switzerland, assignors to International Business Machines Corporation, New York, N.Y., a corporation of New York
Filed Dec. 22, 1960, Ser. No. 77,611
Claims priority, application Switzerland, July 21, 1960, 8,370/60
6 Claims. (Cl. 324—79)

This invention relates to a method and a device for controlling a process which is representable by electrical oscillation of high variable repetition frequency, with respect to a reference condition.

There is known a plurality of methods for controlling a process which can be determined by measurement entities, with respect to a desired condition. Generally, these methods employ physical (analogue) measurement entities (e.g., electrical voltages, currents, frequencies, etc.), and analogue techniques are employed for determining the control entity. In such a case one is frequently confronted with the problem of determining with the greatest possible absolute accuracy the difference between two analogue measurement entities which are large with respect to absolute value but which are of no essential difference as to their magnitudes. This requirement cannot be fulfilled in a satisfactory manner by means of the analogue measurement method, since the difference value to be determined is in most cases already of the order of magnitude of the relative measuring error associated with the analogue method and, therefore, a high absolute accuracy for the controlling entity practically cannot be obtained by virtue of the underlying principles.

It is an object of this invention to provide a method for the control of a process which is determinable by means of a physical entity whereby the physical (analogue) entity is converted, at a point in the control circuit located as close as possible to the point of measurement, to a digital entity, for example, a pulse sequence, and the controlling entity is determined with high absolute accuracy from the digital entity.

It is a further object of this invention to provide a digital switching arrangement in which the difference between two digital measurement entities having large absolute value but not differing essentially in magnitude, is determined in an economic manner with high absolute accuracy, by the positive and negative accumulation, i.e., forward and backward counting in a counter of predetermined, relatively low capacity, of single pulses contained in pulse trains of definite length.

With respect to a concrete example of application, it is a further object of this invention to provide a control method of very high accuracy and to describe its circuit arrangement in order to supervise and control the evaporation rate, e.g., during the manufacturing process of thin magnetic film elements.

The inventive method for the control of such process representable by electrical oscillations of variable frequency relies on the basic idea to compare the change of frequency difference (represented in the form of a pulse train) between the variable oscillation and a measuring oscillation of constant measuring frequency of approximately the same order of magnitude, with a reference entity representing the desired condition, whereby said frequency difference change is indicative for the characteristic value of the momentary condition, and to take the difference determined by said comparison as the basis for the control of the process.

Moreover, this invention is concerned with a description of a device for the achievement of the above method for process control. In accordance with the invention, this device comprises a pulse counter which in accordance to a control unit is in operative connection with means for the generation of the variable oscillation and the measuring oscillation as well as with means for the achievement of the pulse sequence representing the frequency difference, also with means for representing the reference entity, and with means for representing the contents of the counter in the form of a sequence of pulses of defined shape: the operative connection being such that the momentary frequency difference is determined by counting out the respective pulse trains in two consecutive, preferably equal time intervals, that the reference entity is subsequently added to the result with the prevailing opposite sign, and finally the contents of the counter is represented as a pulse sequence.

The foregoing and other objects, features and advantages of the invention will be apparent from the following more particular description of a preferred embodiment of the invention, as illustrated in the accompanying drawings.

Figure 3:
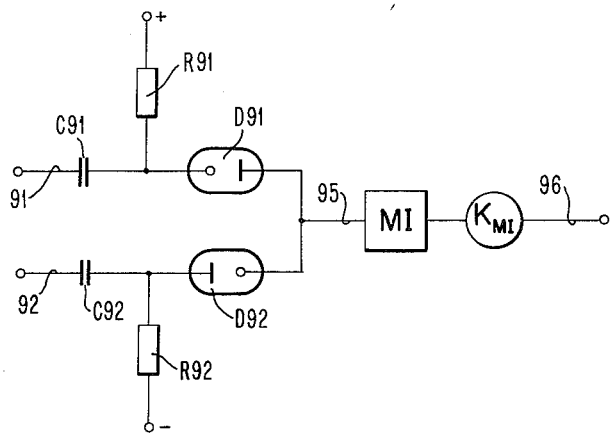
Figure 2:
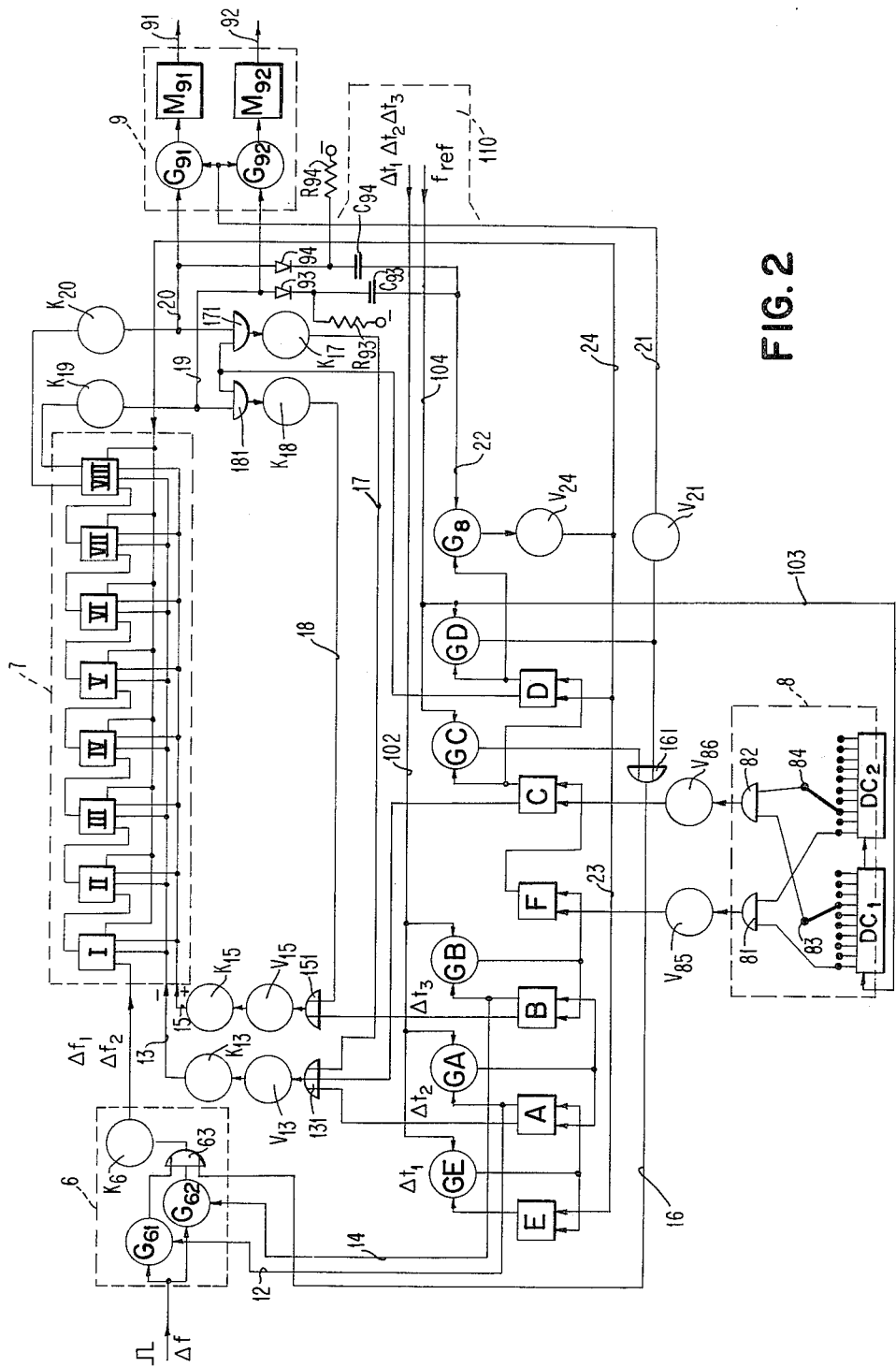

In the drawings:
FIG. 1 is the block diagram of an embodiment of this invention.
FIG. 2 is the detailed circuitry employed in the block diagram of FIG. 1.
FIG. 3 is the circuit for determining the control voltage from the pulse train representing the control entity.

For the sake of simplicity and greater clarity it is assumed—as far as the following explanations are concerned—that the control of an evaporating process is involved in which, for instance, a ferromagnetic metal or a ferromagnetic alloy composition evaporates and deposits in the form of a thin magnetic layer on a substrate. It will be evident that this example does not in any way limit the scope of this invention with respect to application and use in other fields.

In the FIG. 1, a number of oscillation circuits 1 and 2 are provided whose frequencies are determined by quartz crystals 1a and 2a, respectively. The arrangement is tuned so that oscillations of the same or at least approximately the same frequency are excited in both oscillator circuits 1 and 2 at a starting condition, for instance, before the process of evaporation. The frequencies of these oscillations can, for example, amount to a few hundred kc./s. or mc./s. The frequency in oscillator circuit 2 serves as an essentially constant reference or measurement frequency and accordingly remains uninfluenced throughout the entire process to be controlled. On the other hand the quartz crystal 1a is exposed to the metal vapors which deposit on it. The associated increase in volume brings about a change of the natural frequency of this crystal and thereby also a change of the oscillation frequency in oscillator circuit 1. With advancing evaporation, this oscillation frequency grows increasingly smaller, whereby the continuously growing deviation from the uninfluenced measurement frequency of oscillator circuit 2 is a measure for the progress of the evaporation. To determine this deviation, the oscillations of the oscillator circuits 1 and 2 are conveyed to a mixing stage 3. In a low pass filter 4 a frequency difference, e.g., of the fundamental frequencies $f_2 - f_1$, is filtered out of the frequency spectrum delivered by the mixer. This difference formation compensates simultaneously for any possible undesired parameter variations (e.g., temperature change) to which both frequency determining elements 1a and 2a are subjected.

The sinusoidal oscillations of the difference frequency $f_2-f_1$ are supplied to a trigger 5 in which they are converted into a sequence of single pulses of frequency $\Delta f = n(f_2-f_1)$, with—if occasion arises—simultaneous frequency multiplication (e.g., frequency doubling in a Schmitt trigger). It will be advantageous to arrange the circuit such that the pulse sequence frequency $\Delta f$, which generally varies during the process to be controlled, is of the order of magnitude of a few thousand to a few hundred thousand cycles per second.

This pulse sequence with the sequence frequency $\Delta f$, which varies (increases) with respect to time as a result of the progressing evaporation, is now fed to a gate circuit 6.

It is now the function of the gate circuit 6; a pulse counting stage 7, a counter stage 8, and a further gate circuit 9, all under control of a control unit 10 to provide a digital representation of the rate to a control device 11. The details of this circuitry is shown in the FIGS. 2 and 3. Although reference is initially drawn to the FIG. 1 in generally explaining the overall operation of this portion of the circuitry, where possible, similar reference characters are employed in the FIG. 2 and FIG. 3 for clarity.

With reference to the FIGS. 1 and 2, it may be seen that the gate 6 is operated by a control unit, which in its entirety is designated by 10, in a manner—as will be described later in more detail—such that from the continuously arriving pulses (pulse sequence) during two succeeding, equally long intervals $\Delta t_1$ and $\Delta t_2$ a certain amount of pulses (pulse trains) is allowed to pass gate 6 which is open during these intervals and arrives at a pulse counter 7. As it is indicated in the drawing, the pulse train passing gate 6 during the first time interval $\Delta t_1$, i.e., the number of single pulses which it contains, is designated by $\Delta f_1$, in order to distinguish between pulse train $\Delta f_2$ which, analogously, passes gate 6 during the second time interval $\Delta t_2$.

The pulse counter 7 accumulates the single pulses contained in the transmitted pulse trains $\Delta f_1$ and $\Delta f_2$ whereby—as indicated by different polarity symbols ($\pm$)—the counting sense of the pulse counter 7 and thereby the sign of the accumulation is influenced by the control unit 10. The accumulation of the successively arriving two pulse trains is principally performed with reversed sign. In the present case, since $\Delta f_2$ is greater than $\Delta f_1$, the accumulation of pulse train $\Delta f_1$ takes place with counting in the negative sense and subsequently the accumulation of the pulse train $\Delta f_2$ with counting in the positive sense, with the result that the difference in the single pulses contained in the two pulse trains $\Delta f_1$ and $\Delta f_2$ is thereby formed.

Subsequent to interval $\Delta t_2$, the control unit 10 brings about the start of a third time interval $\Delta t_2$—this is indicated in the drawing by an arrow bearing said designation—in that the control unit 10 sets a counting stage 8 into operation. This counting stage 8, which will be described in detail later, contains a preset reference entity which represents the reference condition of the process which is to be controlled. This reference entity or, in other words, the desired condition, is now compared with the difference of amounts of pulses formed in pulse counter 7, i.e., with the actually achieved state dictated by the progress of the process, and the deviation determined from this comparison is employed for establishing the control entity. It is understood that for this purpose the reference entity in the counting stage 8 is also represented as a definite number of single pulses, e.g., as a pulse train $\Delta f_{\text{ref}}$ which, during interval $\Delta t_3$ is fed to pulse counter 7. The single pulses of pulse train $\Delta f_{\text{ref}}$ are accumulated by pulse counter 7; the counting sense—again by means of control unit 10—is established so that (speaking in absolute terms) the difference between the previously formed contents of the counter $(\Delta f_2 - \Delta f_1)$ and the reference entity which is represented by pulse train $\Delta f_{\text{ref}}$, is formed. Thus, the pulse train $\Delta f_{\text{ref}}$ is introduced at any given time into the pulse counter 7 with a sense of accumulation in opposition to the result of the previous accumulations. The absolute deviation value determined in this way is therefore $$|d| = |(\Delta f_2 - \Delta f_1)| - \Delta f_{\text{ref}}|$$

as far as the sign is concerned, it is fundamentally possible for devation $d$ to be either a positive or a negative entity.

After deviation $d$ has been determined, the pulse counter 7 is reset to zero by step-by-step backward counting; this takes place also during the time interval $\Delta t_3$. For the duration of this resetting process a suitable control signal, e.g., a single pulse of a length corresponding to said duration, or a pulse train of corresponding length $\Delta t$, is transmitted from counter 7 to a gate 9. The time $\Delta t$ during which the control signal is effective is obviously proportional to the absolute value of the deviation $|d|$. This control signal opens gate 9 which hereby allows through-passage of a number of pulses proportional to $|d|$ from a pulse train arriving from control unit 10. These pulses which are generated, for example, in a clock-pulse generator belonging to control unit 10 have a fixed clock frequency. Depending upon whether the pulse counter 7 is reset to zero from a positive or negative value, the pulses which are conveyed to gate 9 are effective in the output line as positive or negative pulses, respectively. The sign of the contents of the pulse counter, i.e., the sign of the deviation $d$, is conveyed to gate 9 (symbolically designated in FIG. 1), so that said gate actually releases a pulse train which is characteristic for the devation with respect to absolute value and sign. This pulse train, symbolically designated by $\pm d$, is now fed to a control device 11 which forms a suitable analogue control entity from the pulse train, e.g., in a Miller-integrator, for controlling the process. This will be explained later in more detail, making reference to FIG. 3. Generally, the control device 11 performs the action of a digital-to-analogue converter, in that a pulse train representing a digital control entity is converted into an analogue control entity, e.g., an electrical current of respective intensity or an electrical voltage of characteristic value, which then enables the process to be controlled, to be influenced in a direct manner.

Summarizing briefly: the frequency of the oscillations in the oscillator circuit 1, which vary during the course of the vaporizing process to be controlled, is mixed by superposition with the constant frequency of the oscillations in the oscillator circuit 2, and the different frequency thereby formed is represented as the corresponding sequence frequency of a pulse sequence; during two consecutive time intervals two pulse trains are selected from this pulse sequence and the single pulses which they contain are counted (accumulated) in a counter. The result of this digital counting process gives an indication of the change of difference frequency, i.e., of the progress of the evaporation process; stated more accurately: of the increase in the amount of deposited, evaporated material and, therefore, of the rate of evaporation. This result is compared with a reference entity representing the desired rate of evaporation. The established devation from the reference value thereby conduces to a control of the evaporating process having regard to the desired result.

FIG. 2 represents the design and the circuitry of that part of the device which comprises the gate 6, the pulse counter 7, the counting stage 8, the gate 9 and the control device 10, whereby the controlling means which control the individual components in accordance with the previously mentioned program, are shown in detail. For the sake of simplicity and of easy understanding, the layout of the circuitry and the operative connections of the individual components are explained together with the description of their function.

As the drawing shows the control means comprise a number of flip-flop circuits which are designated E, A, B, F, C and D from left to right in series. In the case of the flip-flop circuits the two control lines are connected at the bottom and the two output lines at the top, whereby it is assumed that the right-hand control line (trigger line) activates and the left-hand control line (reset line) resets the respective flip-flop circuit. It is further assumed that the right-hand output line of an activated flip-flop circuit carries a positive voltage and the left-hand output line a negative voltage and, accordingly, in the following description the right-hand output line is designated as positive and the left-hand output line as negative.

In addition, the circuitry illustrated in FIG. 2 comprises a number of gate circuits G, amplifiers V, cathode followers K, multivibrators M, and logical connectives (AND, OR) of which the latter are represented by standardized symbols. All these circuits are known to the specialist so that it is not necessary to enter into a more detailed description.

It is assumed, at the beginning of the process to be considered here, that the flip-flop circuit E is activated, thereby maintaining the gate GE in an open condition via the positive output line (incidentally, the only one here). At this instant a pulse which determines the commencement of the time interval $\Delta t_1$, and thus bears the same designation, arrives at the reset-line of the flip-flop circuit E and at the trigger line of the flip-flop circuit A; this pulse is generated in a clock pulse generator 110 and is conveyed via line 102 and gate GE which is in open condition. According to the previously mentioned assumption, the flip-flop circuit E is thereby reset and gate GE is thus closed; the flip-flop circuit A is activated simultaneously so that its right-hand and left-hand output lines conduct the appropriate positive or negative voltages. First of all, the voltage present in the positive output line of the flip-flop circuit A causes gate GA to open and at the same time also a gate $G_{61}$ via line 12 which is connected with the positive output line; gate $G_{61}$ represents a part of the previously mentioned gate unit 6 (FIG. 1). A certain number of single pulses of the pulse sequence $\Delta f$ now arrives through the open gate $G_{61}$, via the OR-circuit 63 and the cathode follower $K_6$ at the binary pulse counter 7 where for the duration of the time interval $\Delta t_1$ the pulses are accumulated. The counting sign is determined by the voltage present in the negative output line of the flip-flop circuit A. By way of the OR-circuit 131, the amplifier $V_{13}$ and the cathode follower $K_{13}$, this voltage determines the potential in line 13 the result of which, moreover, is that counter 7 counts in a negative sense during the time interval $\Delta t_1$, i.e., during the accumulation of the pulse train $\Delta f_1$. This circumstance is indicated in the drawing symbolically by the "—" sign.

As far as the pulse counter 7 itself is concerned, it should be noted that it comprises in a manner which is actually known, a number of flip-flop counter stages; in the present case eight such stages I to VIII are involved. The capacity of the counter is $2^8=256$. Said counter should obviously be designed with a capacity at least twice as large as the largest possible deviation $d$. Naturally, the total number of single pulses of each of the pulse trains $\Delta f_1$ and $\Delta f_2$ to be counted exceeds by far the capacity of the counter; nevertheless, this circumstance remains unimportant since $\Delta f_1$ and $\Delta f_2$—regarded from an absolute point of view—differ only slightly from each other, so that the result of the countings which take place first with negative and then with positive sign modulo 256 will, however, be within the capacity of the counter. It does not seem necessary to describe in more detail the construction and function of pulse counter 7, since its layout is conventional. It is only desired to point out that the zero position of the pulse cunter 7 is located at 128. The negative numbers are therefore—and this will be clear to the specialist without further explanation—characterized by the one position of the last flip-flop counter stage VIII of the pulse counter and the positive numbers by the other position.

At the conclusion of time interval $\Delta t_1$ the clock pulse generator 110 which forms part of control device 10 illustrated in FIG. 1, gives a further pulse via line 102 which determines the commencement of time interval $\Delta t_2$; this pulse which—as indicated in FIG. 2—may be referred to as $\Delta t_2$-pulse passes through the open gate GA into the reset line of the flip-flop circuit A and the trigger line of flip-flop circuit B. The flip-flop circuit A is thereby reset so that gate GA and gate $G_{61}$ are closed. Pulse counting in counter 7, in the negative sense, thereby stops. However, flip-flop circuit B is activated simultaneously whereby the voltage in the positive output line of this circuit reaches gate GB and, via line 14, a further gate $G_{62}$ of gate unit 6, so that gate GB and gate $G_{62}$ are opened. Pulse train $\Delta f_2$ from pulse sequence $\Delta f$ now passes through gate $G_{62}$ into the pulse counter 7 where the pulses (now in a direction which is opposed to the previous direction) are accumulated. The sign of this count is determined by the voltage in the negative output line of flip-flop circuit B; via an OR-circuit 151 and after suitable amplification in amplifier $V_{15}$ and in the cathode follower $K_{15}$ this determines the potential of line 15 connected with counter 7. As stated before, the count takes place during the time interval $\Delta t_2$ in a positive sense: this is depicted in FIG. 2 symbolically the sign "+" allotted to line 15. Thus at the end of time interval $\Delta t_2$, the pulse counter 7 is in a position which indicates the difference existing in the number of single pulses contained in the pulse trains $\Delta f_1$ and $\Delta f_2$. The end of time interval $\Delta t_2$ and the beginning of time interval $\Delta t_3$ are determined by the pulse $\Delta t_3$ emitted by clock pulse generator 110 via line 102; this pulse reaches the reset line of flip-flop circuit B and the trigger line of flip-flop circuit F via the opened gate GB. Flip-flop circuit B is thereby reset, so that gates GB and $G_{62}$ are closed; now the pulse accumulation in a positive sense in counter 7 ceases.

The $\Delta t_3$-pulse also reaches the trigger line of flip-flop circuit F and activates it. This, however, is ineffective with respect to the series-connected flip-flop C which with its trigger line is connected with the right-hand (the only one present here) output line of flip-flop circuit F; such circuit arrangement is, in fact, known to one skilled in the art. Here, the series-connected flip-flop C is activated only by the reset of flip-flop F (not by its activation): thus this series-connection of two flip-flops achieves a delay effect.

The reset line of flip-flop circuit F is connected with counting stage 8 which, as the drawing shows, comprises two decimal counting stages $DC_1$ and $DC_2$ consisting, in essential, of cold-cathode counting tubes. A pulse sequence of definite clock frequency $f_{ref}$ is supplied to the counting stage 8 from the clock pulse generator 110 via lines 104 and 103. As an example, it is assumed that the clock frequency is 10 kc./s. The desired value for the rate of evaporation, i.e., the reference entity $\Delta f_{ref}$ is adjusted as desired at the counting stage 8; in case of an example $\Delta f_{ref}=26$, the switch 83 for the ones position is located at selector position "6" and switch 84 for the tens position is located at selector position "2". The selector positions 0 to 9 of the counting stages DC are pulsed in progressive sequence—as the specialist knows sufficiently well—in conformity with the pulses arriving via line 103. The circuit is arranged so that the AND gate 81 signals the beginning and the AND gate 82 the end of a time interval characterizing the reference entity. The pulse characterizing the beginning is conducted via the AND gate 81 and the amplifier $V_{85}$ to the reset line of flip-flop circuit F, whereby this flip-flop is reset. As mentioned, the resetting of flip-flop circuit F leads to the activation of flip-flop circuit C. Basically, the actual operation of counting in the counter 7 during the time interval $\Delta t_3$ introduced by the $\Delta t_3$-pulse does accordingly not start until both stages of counting stage 8, which is kept running with the high repetition frequency $f_{ref}$ of, for example, 10 kc./s., are just passing through their zero positions.

The flip-flop circuit C which, as stated above, is now in an activated condition, opens by way of its right-hand output line the gate GC and brings about a pulse count in counter 7 in a negative sense by way of the voltage in its left-hand output line which determines the potential in line 13 via the OR-circuit 131, the amplifier $V_{13}$ and cathode follower $K_{13}$. The clock pulses of frequency $f_{ref}$ transmitted via line 104 are fed through the open gate GC and the OR-circuit 161, to line 16 and finally via the OR-circuit 63 and the cathode follower $K_6$ of gate 6, to the pulse counter 7, where said clock pulses are accumulated in a negative sense to the result of the preceeding counts. This accumulation, which commences when counting stage 8 is in its zero position, ceases when the AND-gate 82 signals the end of the time interval representing the reference entity by a pulse which is transmitted to the reset line of the flip-flop circuit C via amplifier $V_{86}$; this effects firstly the closure of gate GC by means of the right-hand output line of flip-flop C, and secondly a change of voltage in the left-hand output line of flip-flop C, which becomes also effective with respect to line 13 via OR-gate 131, amplifier $V_{13}$ and cathode follower $K_{13}$. As a result, the process of pulse counting in counter 7 ceases. This counter stands now in a position which is indicative for the deviation $d$.

When the flip-flop C is reset, a signal arrives in the trigger line of flip-flop circuit D via the right-hand output line of flip-flop C; flip-flop circuit D is thereby activated and gate GD is opened. The activation of this last named flip-flop circuit indicates the beginning of the count of the contents of pulse counter 7, i.e., the determination of deviation $d$. The clock pulses in line 104 now reach line 16 through the opened gate GD and via the OR-circuit 161; furthermore, they are supplied to pulse counter 7 via OR-circuit 63 and cathode follower $K_6$. Said counter subtracts these pulses continuously from its contents. The sign of this counting process is directly determined by the contents of the counter; it is opposed to the sign of the contents of the counter. As already mentioned, the sign of the latter is signalled at any one time by the position of the last binary counter stage VIII of pulse counter 7. The respective signal transmitted by way of the left- or right-hand output line of the last counter stage via cathode followers $K_{19}$ or $K_{20}$ (said signal being practically the voltage which signals the sign of the contents of the counter) arrives finally at pulse counter 7, if simultaneously a corresponding voltage occurs at the left-hand output line of flip-flop circuit D via the AND-gate 181, cathode follower $K_{18}$, line 18, OR-circuit 151, amplifier $V_{15}$, cathode follower $K_{15}$ and line 15, or via the AND-gate 171, cathode follower $K_{17}$, line 17, OR-circuit 131, amplifier $V_{13}$, cathode follower $K_{13}$, and line 13. Simultaneously, the signal transmitted via the left- or right-hand output line of the last counter stage VIII of the counter, reaches gates $G_{92}$ or $G_{91}$ of gate unit 9 via the associated cathode followers $K_{19}$ or $K_{20}$ and lines 19 or 20, whereby the respective gate is opened. In this way the path for the 10 kc./s. clock pulses is made free, which are fed to the gates $G_{91}$ and $G_{92}$ via line 104, open gate GD, amplifier $V_{21}$ and line 21. Depending upon which of said gates $G_{91}$ or $G_{92}$ is in an open condition, the gate unit 9 delivers pulses either to line 91 or line 92 via multivibrators $M_{91}$ or $M_{92}$. These pulses continue until the pulse counter 7 reaches the zero position when counting-out its contents. This is made apparent by the triggering of the last counting stage VIII of the pulse counter 7 whereby potential changes take place in its two output lines; in one output line a change from negative to positive takes place in the voltage and in the other output line the potential change is reversed, i.e., from positive to negative. This change of voltage is also apparent in the lines 19 and 20 which are connected with two diodes 93 and 94.

Owing to the non-conducting condition (high ohmic resistance) of the one, and the conducting condition (low ohmic resistance) of the other of the two diodes 93 and 94, one circuit arrangement comprising the elements: cathode follower $K_{19}$, diode 93, resistance $R_{93}$ and capacity $C_{93}$, has a considerably different time constant by comparison with the other circuit arrangement comprising the elements: cathode follower $K_{20}$, diode 94, resistance $R_{94}$ and capacity $C_{94}$. The result is that with respect to line 22 the voltage change from negative to positive (regardless of whether this occurs in the right-hand or left-hand output line of the counter output stage) will have a steeper pulse raise than an opposed change of voltage level. Although the circuit concerned is arranged in a perfectly symmetrical manner, its function is nevertheless asymmetrical. In order to achieve this purpose it is obviously also possible to design different circuits. The only requirement is to effect the appearance of a signal in line 22 always at the switching of the last counter stage VIII of counter 7, regardless of the direction in which this switching takes place.

The signal which is accordingly generated by switching the last counter stage VIII and which is independent of the switching direction reaches, via line 22, gate $G_8$ which is held open by the flip-flop circuit D. Said signal is fed through gate $G_8$ and via an amplifier $V_{24}$ to lines 23 and 24, i.e., to the resetting line of flip-flop D which is thereby reset, and to the trigger line of flip-flop E which is thereby activated. By means of the resetting of flip-flop D, the gates GD and $G_8$ are closed, which results in stopping of pulse counting in counter 7. The signal transmitted through line 24 reaches pulse counter 7 and brings about the resetting of this counter to the initial position. With this action the same functional conditions are restored as those which were assumed at the commencement of the foregoing explanations, and it is now possible to start again with the determination of a new deviation $d$.

The pulse sequence frequency for the pulses arriving via line 102 is, for example, 1 c./s.; i.e., the pulses designated by $\Delta t_1$, $\Delta t_2$, $\Delta t_3$ arrive at equal intervals of one second. According to this example, the total cycle for the determination of a deviation value $d$ lasts 3 seconds.

The manner in which a control voltage can be generated from a pulse train which represents a negative control entity $-d$ arriving at line 91, or from a pulse train representing a positive control entity $+d$ arriving at line 92 is shown in FIG. 3 by way of an example. The line 91 is connected to the cathode of a diode $D_{91}$ via a capacity $C_{91}$. This cathode is also connected via a resistance $R_{91}$ to a positive potential. The line 92 is connected via a capacity $C_{92}$ to the anode of a second diode $D_{92}$. This anode is also connected via a resistance $R_{92}$ to a negative potential. The anode of the diode $D_{91}$ and the cathode of the diode $D_{92}$ are connected commonly with a line 95 which is connected to the input of a Miller-integrator MI. It is evident that both diodes $D_{91}$ and $D_{92}$ can be assembled in a duodiode.

The Miller-integrator is known to the specialist and, therefore, does not require any further explanation. It is based on the conception of charging a fixed capacitor with currents of definite (possibly variable) amplitude and certain duration with respect to time (e.g., pulses), i.e., to integrate the current with respect to time. It is practical to supply the charging voltage of the capacitor of the Miller-integrator via a cathode follower $K_{MI}$ to the output 96, where it can be used as a positive or negative control voltage for directly controlling the process.

If rectangular pulses having positive and negative amplitudes arrive at line 91, the negative amplitude portions bring about a reduction of the cathode potential of diode $D_{91}$. This causes the diode to conduct, the input 95 becomes negative and the capacitor of the Miller-integrator is charged negatively; thus a negative control voltage occurs at the output 96. If, however, rectangular pulses of the same form arrive at line 92, their positive amplitude portions bring about an increase of the anode potential of diode $D_{92}$. Now, this diode conducts, the input 95 becomes positive and the capacitor of the Miller-integrator is charged positively; thus a positive control voltage occurs at output 96. Finally, it is wished to observe that the time constant of the Miller-integrator (when the two diodes $D_{91}$, $D_{92}$ are in a non-conducting condition) must be very much greater than the control interval (three seconds was assumed in the example described), in order to insure that the most uniform control voltage possible is available.

While the invention has been particularly shown and described with reference to a preferred embodiment thereof, it will be understood by those skilled in the art that various changes in form and details may be made therein without departing from the spirit and scope of the invention.

What is claimed is:

1. In a system for controlling a given process which is represented by oscillations of variable frequency with respect to a reference frequency, means for measuring a change of frequency difference between the oscillations of the variable frequency during a first time interval and a second succeeding and similar time interval to indicate a momentary characteristic value of the process, means for producing a reference frequency indicative of a desired characteristic value of said process, and means including said measuring means for comparing said change of frequency difference with said reference frequency to provide an output signal indicative of the rate of change of said variable frequency.

2. In a system for controlling a given process which is represented by oscillations of variable frequency with respect to a reference frequency, means for converting each oscillation, whose frequency equals the variable frequency reduced by the reference frequency, to a digit representing pulse to provide a sequence of pulses, means including a pulse counter operable during a first and a second successive and similar time interval for accumulating a difference between said sequence pulses received during said first time interval and said sequence pulses received during said second time interval, and means including said last means for thereafter comparing the contents of said counter with a digital reference entity to provide an output signal for controlling said given process.

3. The system as defined in claim 2, wherein said counter is operable to additively count the pulses during said first interval of time and further operable to thereafter subtract the pulses during said second interval of time from those accumulated in said first interval of time.

4. In a system for controlling a given process having a reference oscillator circuit, a variable oscillator circuit whose frequency of oscillation is varied as a function of the process, and means for mixing the outputs of both said reference and variable oscillator circuits to provide their difference in the form of a sequence of pulses, means coupled to said last means for determining the rate at which said process is progressing comprising, first means operable during both a first and a second successive and like interval of time for accumulating the difference of said pulses in said different intervals of time, and further means including said first means for both comparing the difference of said pulses accumulated with a reference entity and providing an output signal indicative of a variance of said difference of pulses accumulated from said reference entity.

5. In a system for controlling a given process having a reference oscillator circuit for providing a reference frequency, a variable oscillator circuit whose frequency of oscillation is varied as a function of the process with respect to said reference frequency, and means for mixing the outputs of both said reference and variable oscillator circuits to provide their difference in the form of a sequence of pulses, means coupled to said mixing means for determining the rate at which said process is progressing comprising, first means operable during both a first and second successive and similar interval of time comprising a pulse counter for accumulating a difference of said pulses in said first and second intervals of time, and means including said first means comprising a control counter having a reference entity defining a predetermined rate stored therein for both comparing the value in said pulse counter with the reference entity in said control counter and providing an output signal indicative of the actual rate at which said process is progressing.

6. In a system for controlling a process of deposition, a reference oscillator circuit having a frequency of oscillation $f_1$, a variable oscillator circuit having a frequency of oscillation $f_2$ whose frequency varies as the deposition process progresses, means for mixing the outputs of said oscillator circuits and providing their difference $\Delta f$, a trigger circuit for generating a pulse sequence whose frequency corresponds to the difference frequency $\Delta f$, means coupled to said trigger circuit operable during a first interval of time and a succeeding second interval of similar time for accumulating a difference between pulses received from said trigger circuit during said first interval of time and pulses received from said trigger circuit during said second interval of time, and means including said last means for comparing the difference of pulses accumulated with a reference entity representing a predetermined rate at which said process is to progress to provide a signal which is indicative of a variance of said process with said predetermined rate.

References Cited by the Examiner
UNITED STATES PATENTS

| | | | |
|---|---|---|---|
| 2,411,298 | 11/1946 | Shore | 324—79 |
| 2,414,479 | 1/1947 | Miller | 324—68 |
| 2,768,629 | 10/1956 | Maul | 324—61 |
| 2,880,612 | 4/1959 | Coyne et al. | 324—79 X |
| 2,902,765 | 9/1959 | Chater | 324—78 X |
| 2,991,416 | 7/1961 | Ramp et al. | 324—79 |
| 3,006,547 | 10/1961 | Fellows et al. | 324—78 X |

WALTER L. CARLSON, *Primary Examiner.*

SAMUEL BERSTEIN, *Examiner.*